March 12, 1963
D. W. NOREN
3,080,905
METHOD FOR DECORTICATING SAFFLOWER SEED
Original Filed Sept. 11, 1959
5 Sheets-Sheet 1
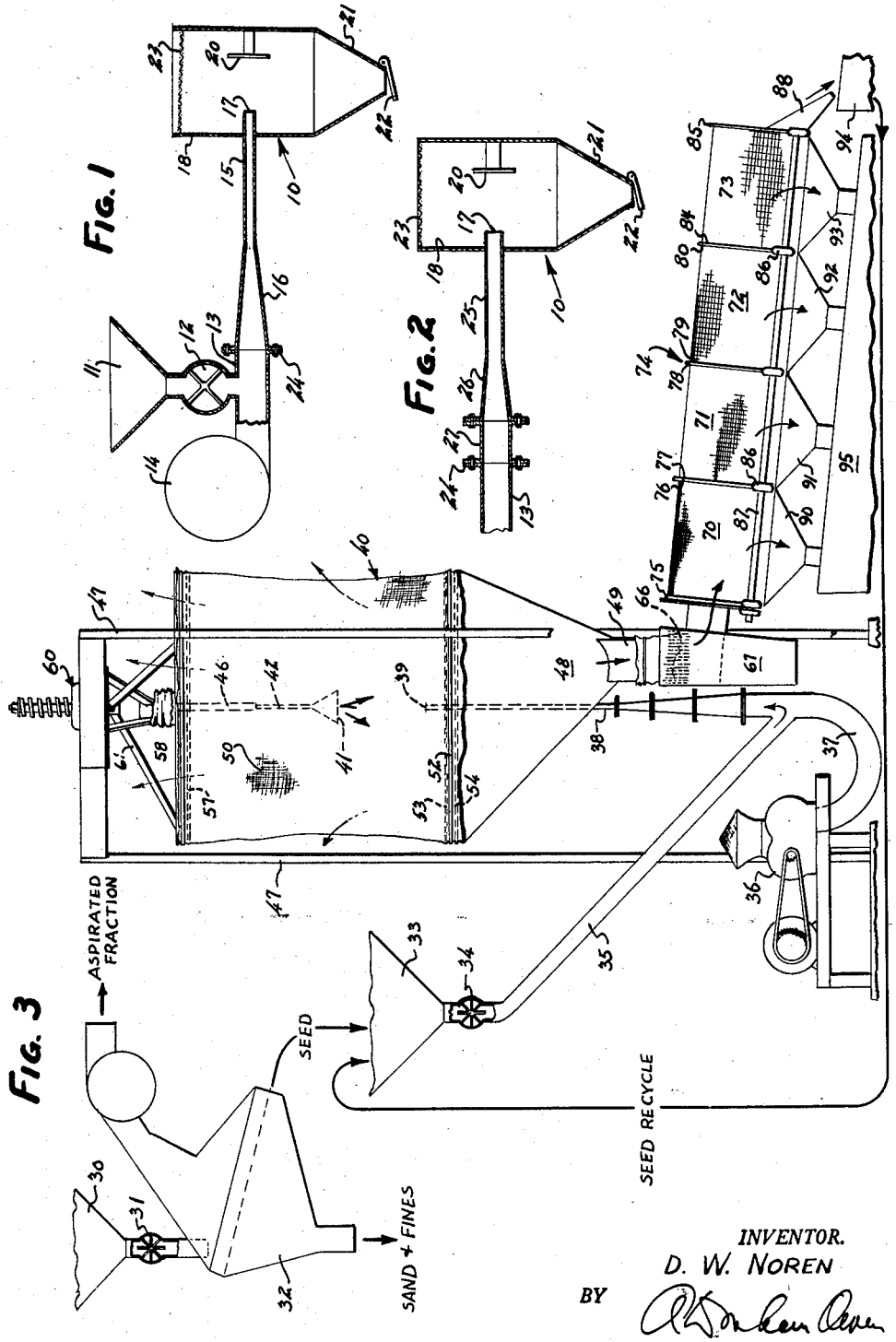
INVENTOR.
D. W. NOREN
BY
ATTORNEY

INVENTOR.
D. W. NOREN
BY
ATTORNEY

March 12, 1963      D. W. NOREN      3,080,905

METHOD FOR DECORTICATING SAFFLOWER SEED

Original Filed Sept. 11, 1959      5 Sheets-Sheet 3

INVENTOR.
D. W. NOREN

BY *O. Durham Oliver*

ATTORNEY

March 12, 1963   D. W. NOREN   3,080,905
METHOD FOR DECORTICATING SAFFLOWER SEED
Original Filed Sept. 11, 1959   5 Sheets-Sheet 4

INVENTOR.
D. W. NOREN
BY

ATTORNEY

March 12, 1963 D. W. NOREN 3,080,905
METHOD FOR DECORTICATING SAFFLOWER SEED
Original Filed Sept. 11, 1959 5 Sheets-Sheet 5
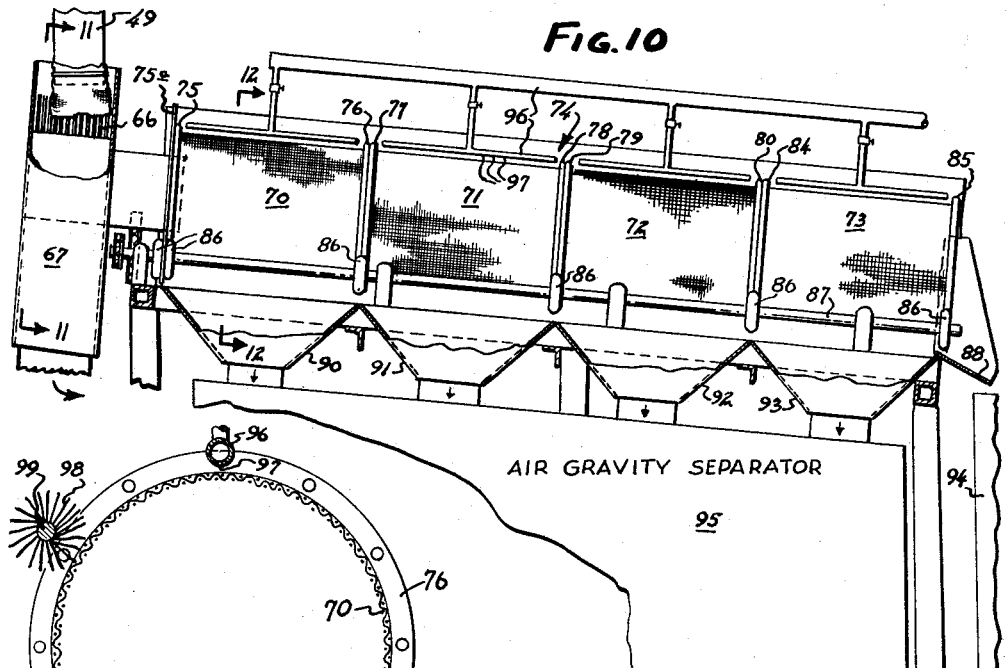
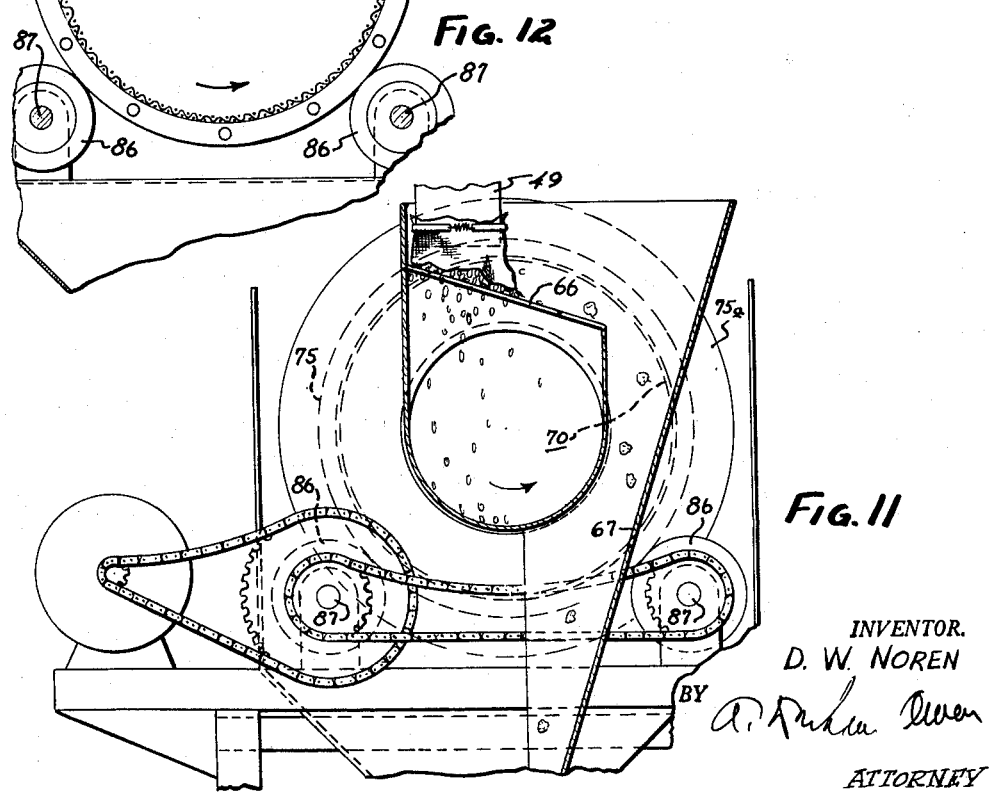
INVENTOR.
D. W. NOREN
ATTORNEY

United States Patent Office 3,080,905
Patented Mar. 12, 1963

3,080,905
METHOD FOR DECORTICATING
SAFFLOWER SEED
Don W. Noren, Pleasant Hills, Calif., assignor to Pacific Vegetable Oil Corporation, San Francisco, Calif., a corporation of California
Original application Sept. 11, 1959, Ser. No. 839,432. Divided and this application June 14, 1960, Ser. No. 42,736
9 Claims. (Cl. 146—221.5)

This invention relates to a method for decorticating safflower seed. This application is a division of application Serial Number 839,432, filed September 11, 1959, which was a continuation-in-part of application Serial Number 758,096, filed August 29, 1958, now abandoned.

Safflower seeds have kernals with high oil content enclosed in fibrous hulls of very low oil content. The thick, hard, fibrous hull, having an oil content of only about 2%, comprises about 40% by weight of each seed. In contrast, the kernel or meat is very soft and has an oil content of about 56%.

The oil can be obtained more economically by cracking the hulls and removing them. By separating the oil-bearing meat from the hulls, the meat can be processed more efficiently to obtain the valuable oil, while the hulls can be given different treatment or used for other purposes. The hull is quite strong, and is not easily cracked by normal methods, but if the hull can be cracked without smashing the kernel, so that the oil remains in the kernel, the hull can be cleanly removed and the kernel can then be processed quite easily and inexpensively by pressing and extracting.

However, serious difficulties in the decortication of safflower seeds arise from the fact that the oily meat is sticky and gummy. When safflower seeds are cracked by normal methods, the oil cells are easily broken and the meat then sticks to the hull. Moreover, this rupture of the oil cells tends to clog all types of decortication devices heretofore known.

Some kinds of seeds can be successfully decorticated by whirling them around and projecting them by centrifugal force against rotating pins. But when this procedure was tried with safflower seeds, the apparatus became completely clogged and gummed within fifteen minutes. It had to be stopped, disassembled, cleaned, and reassembled. Operation was uneconomical and impractical because more time had to be spent in cleaning the device than in operating it, and the net production rate was small. Moreover, the oil cells of the kernels were ruptured, and this caused the broken hulls to stick to the kernels; separation of the hulls from the kernels became impractical; so nothing was gained by cracking the hull by this method.

Another device, which had been used successfully for some types of oil-bearing seeds, comprised an inner impeller within an outer cylinder. The impeller blade passed near a stone supported in the lower portion of the cylinder, and the impeller imparted movement to the seeds, scraping them along the cylinder and striking them against the stone, thereby breaking them by impact. However, when safflower seeds were introduced into this device, the machine soon became plugged and stuck, because the product that formed was oily and gummy. Moreover, the oil-bearing cells were broken, and oil was imparted to the hull, nullifying to a large extent any value in decortication, because it became very difficult to separate the cracked hulls from the smashed meats, and when some separation was achieved, much valuable oil remained on the hulls.

So impractical were these decortication apparatus heretofore used that the art had abandoned the attempts to use them and instead was resorting to the time-honored practice of simply compressing the safflower oil out of the entire seeds, hull and all. While a wasteful process, it is preferable to decortication if the kernels are crushed and mangled at the time the hulls are cracked.

The mashing and breaking of safflower seeds was, therefore, a prime problem, for it not only made separation of the hulls and meat difficult but tended to plug up the machines and to produce simply a gummy mass that left the operation no better than if the uncracked seed were simply placed originally into a press and the oil squeezed out. Thus, among the problems to which this invention is directed are not only the initial one of how to crack the hard-hulled safflower seeds but also how to crack them in a way that does not clog the cracking apparatus and that does not make separation of the cracked hulls from the meat particles more difficult than ever. The problems include how to achieve decortication without introducing severe maintenance difficulties, how to control the cracking, how to prevent gumming, and how to remove the gummed particles quickly and easily when gumming does ocur. All these problems and several others are solved by the present invention, which also has other important advantages that will be explained later.

Basically, the invention comprises introducing the safflower seeds into a stream of rapidly moving air, speeding up the velocity of the entrained seeds solely by the airstream, and then impinging the seeds at a critical velocity level against a planar target so as to crack them by impact. Apparatus practicing this invention can be made with a minimum of moving parts, and the parts can be so housed that the maintenance problem is reduced to a minimum. Cleaning is seldom necessary, for the device is self-cleaning, and when cleaning is desired, it can be done in but a few moments. The type and extent of the cracking can be controlled quite easily by varying the velocity of the airstream, and with such control decortication can be achieved without causing the gummy produce obtained in other devices. Nor does the equipment gum up with the sticky components of the broken material.

Even more important, the decorticator of this invention does not mangle safflower seeds and does not force the oil out of the meats or even rupture the oil cells. A most surprising and astonishing result is that the meats which come out from this decorticator carry with them all the safflower oil while still giving the appearance of being rather dry. The hulls come out completely dry and, by this invention, are easily separated from the dry meat.

Apparently this novel result is obtained because of the fact that this invention cracks the seed by a single, very sharp blow. The action is an instantaneous decelaration, a single application of force which cracks and breaks the hull without damaging the oil cells of the meat. The hulls are cleaved rather than smashed open; they break along fault lines. The force is well oriented and, in fact, every seed hits the target with substantially the same force and this force strikes against about the same point on the seed hull, within small limits. In decorticators where the seeds strike pins or other apparatus, the seeds can hit in any of a variety of positions, and sometimes they hit several times. They can hit the side of the walls or other pins, and therefore there is no uniformity. But in the present invention every seed is in substantially the same attitude when it strikes its flat target. There is no random impact; the impact is controlled. It is possible by regulating the air flow and the time of speeding up to achieve a pattern in which every seed flows along in substantially the same angle to the direction of its flow. This orients the cracking and, since each seed has substantially the same velocity, each seed receives substantially the same force in the same place. So the cleavage that results leaves all the oil in the meat and the hull carries only the 2% or so that is there by nature.

The operation is not only simple but is continuous, whereas in many methods continuity is all but unobtainable. Moreover, separation or classification of the cracked particles is readily obtained in the present invention without introducing complicated apparatus.

Other objects and advantages of the invention will appear from the following description of some preferred embodiments thereof.

In the drawings:

FIG. 1 is a view in side elevation and in section of a simplified form of decorticator embodying the principles of this invention.

FIG. 2 is a fragmentary view in side elevation and in section of a portion of a device like that of FIG. 1 with a modified taper.

FIG. 3 is a view in side elevation, partly diagrammatic, of a more comprehensive apparatus embodying the principles of the invention, comprising a decorticator, classifiers, and apparatus for separating the meat particles from the hull particles.

FIG. 10 is an enlarged view in side elevation, partly broken away and shown in section, of the classifying and separating apparatus of FIG. 3.

FIG. 11 is a view in section taken along the line 11—11 in FIG. 10.

FIG. 12 is a cross-sectional view of a trommel, taken along the line 12—12 in FIG. 10.

Figure 4:
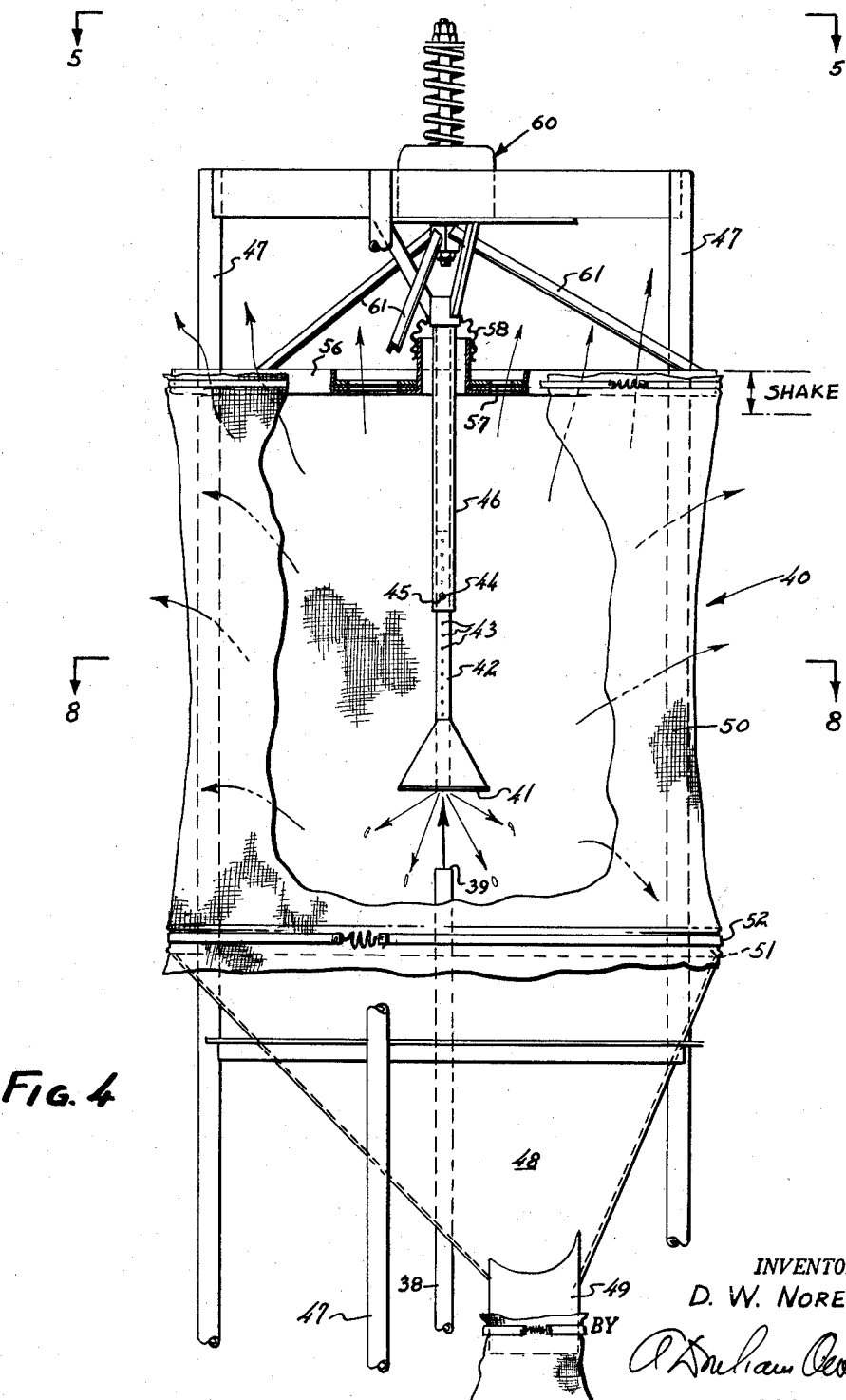
FIG. 4 is an enlarged view in elevation, with parts broken away and shown in section, of the decorticator of the FIG. 3 apparatus.

Referring first to the simple apparatus 10 of FIG. 1 and the method it illustrates, whole safflower seed is introduced to an inlet 11 whence it passes through an air lock valve 12 into a pipe 13. Meanwhile a blower 14 of suitable capacity impels air through the pipe 13 in a relatively low-pressure stream of substantial velocity. The airstream entrains the seed and carries it to the right in FIG. 1. The relatively large-diameter pipe 13 is connected to a pipe portion 15 of much smaller diameter by a tapered section or portion 16. In this tapered section, the velocity of the airstream is considerably increased; so that the velocity of the seed is accelerated considerably by the time it reaches the narrow-diameter pipe portion 15. The pipe portion 15 may be termed a blow gun or nozzle, for it expels a narrow rapid stream of air with entrained seeds from its muzzle or outlet end 17.

The seeds and air are expelled or "shot" from the gun 15 inside an enclosure or housing 18 and impinge against a target 20, which is preferably a flat planar, unimpeded piece of metal supported by the housing 18. The solids may fall from the target 20 into a hopper 21, which may comprise a lower end portion of the enclosure 18, and may be taken out an outlet 22, while the air may pass up and out through a screen 23 of fine enough mesh to prevent loss of seed particles.

The rapidly-traveling safflower seed strikes sharply against the target 20 and is instantly decelerated in a single instant. By proper operation of the blower 14 and proper sizing of the pipe portions 13, 15, and 16, the velocity of the seed may be adjusted to an optimum value. Moreover, the orientation of the seeds as they strike the target 20 is substantially uniform, so that at any adjustment the conditions can be well regulated. Thus, by regulating the speed of the seed at the muzzle 17 and by regulating the distance between the muzzle 17 and the target 20, the desired type of decortication can be obtained. Exact values depend on the kind and condition of seed, but the general consideration of the proper value is an important feature of the invention. The percentage of seeds cracked can be increased by increasing the air speed, but when the air speed becomes too great, oil cells may be broken and it then becomes difficult to separate the hulls from the meat.

While the exact speeds to be used depend on the state of the seed (whether green or ripe, etc.), and the kind of cracking desired, the following general considerations are important.

The actual velocity of the seeds could not be measured directly by any equipment available to me. However, the apparent seed velocity can be measured indirectly by equations that I have developed. The first equation is:

$$\frac{S_g}{U_T^2} = \frac{U_P}{U_F - U_P} + \log_e\left(\frac{U_F - U_P}{U_F}\right)$$

where:

$U_P$ is the velocity of a seed at the time it strikes the target,

S is the distance the seed travels through nozzle at constant cross sectional area, $g$ is the well-known acceleration due to gravity, $U_T$ is the terminal velocity of the seed when falling freely in air, being the result of $g$ balancing the buoyance of the seed, and $U_F$ is the average velocity of the air at the nozzle, being determined as the quantity of air moving through the nozzle divided by the area of the nozzle.

The equation is not easily solved for apparent particle velocity ($U_P$) or average air velocity in nozzle ($U_F$) but can be used without other than normal difficulties, by using well-known trial-and-error methods of approximation.

The apparent particle velocity $U_P$, as derived from the equation, does differ somewhat from particle to particle, partly due to the fact that particles in the center of the stream travel somewhat faster than those near the edges. Also, $U_T$ and the mass of the particles do vary.

Safflower seed can be decorticated over a wide range of air velocity, from about 450–1000 feet per second, and the dimensions of the apparatus and the air-speeds involved can be varied to fit the desired condition of the decorticated seed and the tonnage per hour desired. Well-dried safflower seed decorticates very well in an airstream having a velocity of 450–650 feet per second, the target 20 preferably being spaced twelve inches from the muzzle 17 at that speed. On the other hand, damp green seed is better handled at an air velocity of 800–1000 feet per second, with the target 20 spaced up to forty inches from the muzzle, with correspondingly higher apparent particle velocities. The apparent particle velocity of the safflower seeds lies between 50 and 330 feet per second.

One practical way of varying the airstream velocity and thus varying the velocity of the seeds is shown in FIGS. 1 and 2. The main pipe 13 (and the blower 14, feed hopper 11, and feed valve 12) are left stationary. The pipe 13 is provided with a flange 24, to which the tapered portion 16 is secured. This tapered portion 16 and small diameter portion or gun 15 may therefore be replaced by a larger small-diameter gun 25 and tapered portion 26. When this is done, the gun 25 and tapered portion 26 are shorter, and an extension 27 is used to keep the length from the pipe flange 24 to the muzzle 17 constant.

The simple apparatus of FIGS. 1 and 2 illustrates the broad concepts: entrainment into a high-velocity, low-pressure airstream, acceleration of the seeds, guidance into a uniform attitude and attainment of uniform velocities within a desired range, and substantially instantaneous deceleration striking the seed with a single sharp blow to crack it along fault lines in the hull, thereby giving clean decortication without mangling or mashing the meat or imparting oil to the hulls.

Further refinements enable continuous, high-efficiency operation of a decorticator-classifier-separator system, into which whole safflower seeds are fed and from which oil-bearing meat particles and substantially oil-free hulls separately emerge. FIG. 3 presents an example of such a system.

Safflower seeds from a storage hopper 30 may be withdrawn through a valve 31 (or by other suitable means) into a seed cleaner 32, of a type well known in the art, to free the seeds from chaff, sticks, stones, and other foreign matter. Such apparatus typically employs screens, air-gravity, and specific-gravity devices. Clean seed passes from the cleaner 32 into a hopper 33. A metering airlock valve 34 (like the valve 12 of FIG. 1) disperses the seed in metered amounts into a relatively large-diameter pipe 35. A blower 36 sends a stream of relatively low-pressure, high-velocity air through the pipe 35 (via an elbow 37, to collect tramp iron) and carries it (as in FIG. 1) into a smaller diameter pipe 38, in this instance shown as vertical, which carries it into a decorticator 40, shown in more detail in FIG. 4.

The decorticator 40 utilizes the pipe 39 as the blow gun or nozzle, with its outlet or muzzle 39 as shown. A flat, horizontal target 41 is spaced up above the muzzle 39 at a suitable distance. The target 41 is mounted on a rod 42 which at regular intervals has perforations 43, enabling adjustment of the vertical spacing between the target 41 and the muzzle 39, for a pin 44 (or a plurality of pins) passes through a perforation 45 in a supporting tube 46 and through a chosen perforation 43 to locate the height of the target 41 as desired. The decorticator 40 provides a supporting structure 47 from which the tube 46 is rigidly suspended and a bin 48 into which the cracked seeds fall and from which they fall out through a bottom outlet 49.

Figure 6:
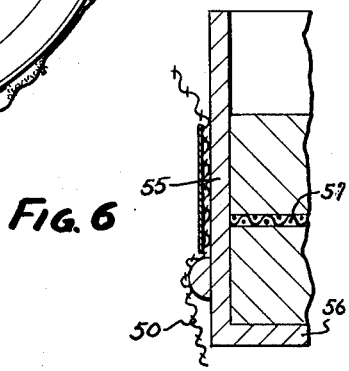
FIG. 6 is an enlarged fragmentary view in vertical section taken along the line 6—6 in FIG. 5.
Figure 8:
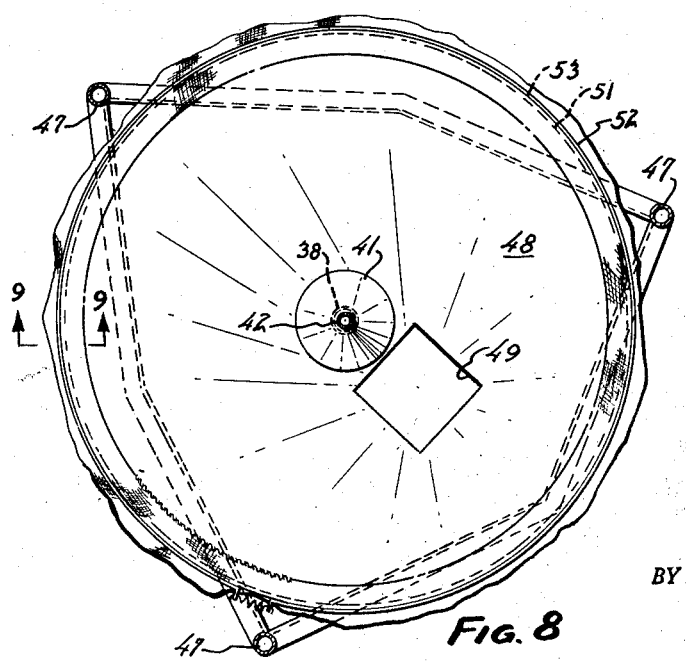
FIG. 8 is a view in horizontal section taken along the line 8—8 in FIG. 4.
Figure 9:
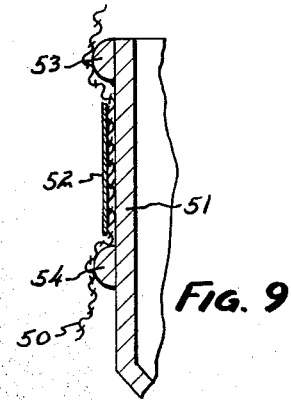
FIG. 9 is an enlarged fragmentary view in vertical section taken along the line 9—9 in FIG. 8.

An enclosure for the decorticator 40 is provided largely by an air permeable cylindrical wall 50, preferably made of cloth or similar flexible material such as Dacron or nylon or other monofilament material including metal and glass, woven so as to let air pass out while holding the solids within. The advantage of using a non-spun, monofilament material (whether stranded or not) is that there are no free ends, as in spun material, to which the oil-bearing meat can stick tenaciously. The lower end of the bag-like wall 50 may be secured to a stationary ring 51 that is at the top of the bin 48 (see FIG. 9). A strap 52 or a garter spring may be used to hold the cloth 50 between two ribs 53 and 54. The upper end of the wall 50 may be similarly (see FIG. 6) secured to the rim 55 of a top ring 56, which also supports a screen 57, which passes the bulk of the air and through which the target-support tube 46 extends out, a boot 58 preventing unwanted passage of unscreened air. The screen 57 is fine enough mesh to prevent passage of the solids, but more of the solids collect on the cloth, due to their being heavier than air.

The result of this air-permeable wall 50, 57 enclosing the target 41 and blow gun muzzle 38 is that after the seeds are cracked open, the solids are retained within the bag-like housing 50 and fall out through the bin 48, while the air that conveyed the seeds into the gun and expelled them from the gun passes out through the wall 50 and screen 57.

A deposit of meat, practically free from hulls, tends to build up on the wall 50. From time to time (or continuously, if desired) the bag 50 is therefore shaken to cause chunks of meat to drop off into the bin 48. For this purpose the ring 56 is connected to a vibrator 60 through a spider 61. These chunks of meat are particularly desirable products; so preferably they are shaken off only intermittently, so as to fall out in large pieces, adhered together by their oil content.

As shown in FIGS. 3, 10, and 11 the solid material issuing from the bin outlet 49 falls on a grizzly 66 or other coarse screen. The chunks of meat slide over the inclined grizzly 66 and fall into a mill-stream hopper 67, while the meat and hull particles fall through the grizzy into a tube 68 that feeds the separator 70. A sock-like cloth sleeve depends from the outlet 49 and prevents seeds and such particles from bouncing from the grizzly into the hopper 67, while being flexible enough to let the chunks slide under it.

It has been found that the specific gravities of the hull and meat are quite different, and that the terminal velocities of the particles depend on their total weight. So it becomes possible to separate the meat from the hulls by first screening the particles according to size and then separating them according to their terminal velocities.

One way in which the screening may be done is shown in FIGS. 3, 10, and 11. This preferred system uses a series of novel trommels 70, 71, 72, and 73, preferably organized as a single cylinder 74 with different segments, each having a different mesh screen. However, completely separate trommels may be used if desired. The trommel assembly 74 may be made by spot-welding the screens 70, 71, 72, 73 to chime rings 75, 76, 77, 78, 79, 80, 84, and 85, and then bolting together the chime rings 76 and 77, the chime rings 78 and 79, and the chime rings 80 and 84. The chime rings run on rubber wheels 86 that run on a pair of common shafts 87. The chime ring 75 at the upper end of the inclined trommel cylinder 74 is provided with a thrust ring 75a that preferably runs between two wheels 86, to support the trommel assembly 74.

The openings through the trommels 70, 71, 72, and 73 get successively larger, so that the first material falls through the trommel 70, the next finest through the trommel 71, and so on, with the coarsest (largely uncracked seeds) falling off an end chute 88 of the last trommel 74.

Each trommel 70, 71, 72, 73 has its hopper 90, 91, 92, 93, and the end chute 88 empties into a hopper 94. Each hopper leads to an air-gravity separator 95, with each hopper being run in turn and separately to one separator 95, or each hopper has its own separator 95 run continuously.

The expedient of having the trommels open inside, the chime rings on the outside and the wheels that drive these all exterior to the trommels, is very effective in preventing plugging of the trommels, for there is nothing for the material to stick to except the screens themselves. Such sticking is taken care of by an air cleaner, comprising a tube 96 with nozzle openings 97, running along, preferably at the top of the cylinder 74, blowing the sticking particles down inside the trommels. A rotary brush 98 may also be used, if desired to assure complete cleanliness; if used, it is mounted rotatably on a shaft 99 that runs parallel to the axis of the cylinder 74.

Figure 7:
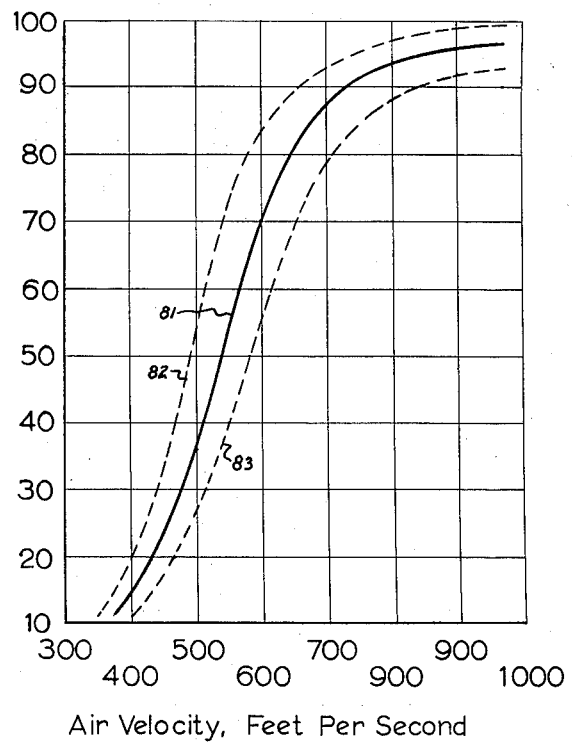
FIG. 7 is a graph plotting the percent of safflower seeds broken against the velocity of the airstream carrying the seeds.

FIG. 7 is a curve 81 showing how one batch of safflower seed responded to increases in velocity in an airstream. In all cases the barrel of the gun 15 was 24 inches long and ½ inch in diameter, and the muzzle 17 was spaced 8 inches from the target 20. As the curve 81 shows, an air velocity of 375 feet per second resulted in 11% of the safflower seeds being cracked open. This velocity was near the threshold of cracking for safflower seeds. At an air velocity of 500 feet per second about 35% of the seeds were cracked. At 575 feet per second, about 63% were cracked; at about 660 feet per second, about 82% of the seeds were cracked, and at 730 feet per second, about 92% were cracked. Above that speed, it takes substantial increases to give substantial effects. To get 96% cracking, the velocity had to be raised to 810 feet per second. At 840 feet per second 97% were cracked, and at almost 1000 feet per second, almost 99% were cracked. However, it seems to be better to operate at lower velocities and recycle the seeds. Actually, many of the seeds called "uncracked" have been weakened or slightly split and on recycling most of them will crack.

By lengthening the gun barrel 15, the curve may be moved to the left, to produce a curve like the curve 82. By shortening the gun barrel 15, a curve 83, to the right of the curve 81, is produced. Optimum conditions depend on the type, ripeness, and even seasonal characteristics of the seed, but enough has been said to show a man skilled in this art how to get optimum results.

Figure 5:
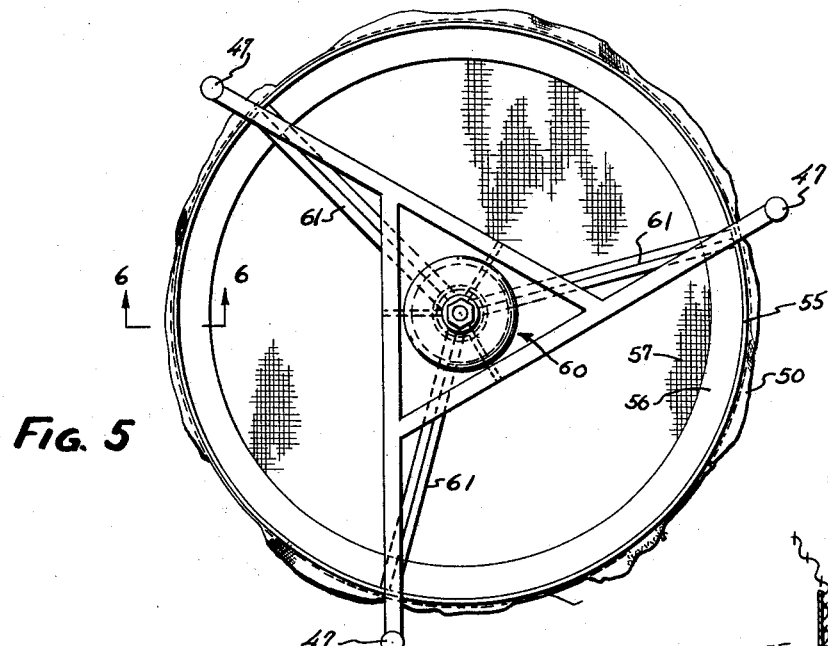
FIG. 5 is a top plan view taken along the line 5—5 in FIG. 4.

In one operation, three tons per hour of safflower seeds were processed through a barrel 7 feet 11 inches long and 2 inches in diameter. The air velocity at the muzzle was 600 feet per second, and the muzzle was spaced 9 inches from the target. The target was of the bucket type shown in FIGS. 4 and 5 and the gun was disposed vertically downwardly. The air in the gun 15 had been flowing through and had picked up the safflower seed in a 4-inch-diameter pipe 13, and the tapered section 16 was 4 inches long. The air in the pipe 13 had a velocity of about 150 feet per second. In this run, 87% of the seed was cracked open on its initial run through the gun. The seed had been cleaned with an aspirator before its introduction into the airstream; however, it still contained much unremovable dockage, principally weed and wheat seeds.

Air and screen separation were used to separate the kernels from the hulls. One batch of 6,172 pounds of safflower seed (including the unremovable dockage) was thereby separated into 3,480 pounds of decorticated meats, 1,876 pounds of hulls, and 813 pounds of whole seeds, much of which would have been cracked in a second pass. The hulls fraction contained some pericarp; the average oil contents of hulls is about 1.4% and of pericarp is about 4.3%. But the hulls fraction had an oil content of only 3.2%, showing that little meat or meat oil was present. The decorticated meat fraction had an oil content approaching 60% and would yield a meal of 42.6% protein.

The results of air separation of one such seed (in this case performed before screening any of the fractions, all of which were easily screened to separate hulls, meats, and whole seed) were as follows:

| Fraction No. | Terminal Velocity in feet per minute | Description |
| --- | --- | --- |
| 1 | 250 | very fine dust of hulls. |
| 2 | 350 | very fine meat, larger hull particles. |
| 3 | 442 | quarter hulls and fine meat. |
| 4 | 525 | half hulls, meat size of large sand grains. |
| 5 | 618 | half hulls, meat size of carrot seeds. |
| 6 | 715 | full hulls, more meat, size of hominy grits |
| 7 | 755 | few full hulls, meat 1/16" diameter. |
| 8 | 880 | very few full hulls, meat 3/32" diameter. |
| 9 | 955 | very few full hulls, meat 1/8" diameter. |
| 10 | 1,000 | a few uncracked seeds, remainder 1/8" meats. |
| 11 | 1,100 | few uncracked seeds, remainder large meats. |
| 12 | 1,120 | more uncracked seeds, large meats. |
| 13 | 1,300− | mostly uncracked seeds, some large meats. |
| 14 | 1,300+ | almost all uncracked seeds. |
| 15 | 1,380− | uncracked seeds. |
| 16 | 1,380+ | uncracked seeds. |

The meat was dry in all instances, showing that the oil cells had not been ruptured.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method of decorticating safflower seeds, comprising entraining seeds in a rapidly moving airstream, accelerating said seeds in said airstream, and instantaneously decelerating them at an apparent particle velocity drop in the range of 50 to 330 feet per second, to crack open more than half of the hulls without crushing, mangling, or rupturing the meats.

2. The method of claim 1 wherein the seeds are well dried and are accelerated in an airstream having a velocity at the time of deceleration of the particles of 450–650 feet per second.

3. The method of claim 1 wherein the seeds are damp and green and are accelerated in an airstream having a velocity, at the time of deceleration of the particles, of 800 to 1000 feet per second.

4. A method of decorticating safflower seeds, which have hulls of low oil content and meats of high oil content, comprising entraining said seeds in a rapidly moving airstream, accelerating said seeds in said airstream, and then instantaneously decelerating them at an apparent particle velocity drop in the range of 50 to 330 feet per second, to crack open the hulls and small enough to prevent oil from being forced from said meats.

5. A method of separating hulls from the oil-bearing meat of safflower seeds, comprising the steps of introducing whole seeds into a rapidly moving stream of air; accelerating the speed of said seeds in said stream; instantaneously decelerating said seeds by impact at an apparent particle velocity drop in the range of 50 to 330 feet per second, to crack the hulls therefrom and low enough to prevent rupture of the oil cells in the meat, leaving both hulls and meats dry; screening the resultant particles into several different sizes, and separating the heavy meats of each size from the light hulls by air-gravity classification depending on their terminal velocities.

6. A method of decorticating safflower seeds, comprising the steps of entraining said seeds in a rapidly moving, low-pressure airstream, accelerating the seeds to an apparent particle velocity between 50 and 330 feet per second, orienting the seeds to a uniform attitude in said airstream, and then impacting said seeds in a single instantaneous blow to decelerate them to about zero velocity, whereby said seeds are split open along fault lines in the hulls without mashing or mangling the meats.

7. A method of decorticating safflower seeds, comprising the steps of entraining said seeds in a rapidly moving, low-pressure airstream having a velocity of 450 to 1000 feet per second, accelerating the seeds to an apparent particle velocity between 50 and 330 feet per second while orienting the seeds to a uniform attitude in said airstream, and then impacting said seeds in a single instantaneous blow to decelerate them to about zero velocity, whereby said seeds are split open along fault lines in the hulls without mashing or mangling the meats, leaving both hulls and meats dry; screening the resultant particles into several different sizes, and separating the heavy meats of each size from the light hulls by air-gravity classification depending on their terminal velocities.

8. A method of decorticating safflower seeds, comprising the steps of impacting said seeds in a single instantaneous blow to instantaneously decelerate them at an apparent particle velocity drop in the range of 50 to 330 feet per second to split said seeds open along fault lines in the hulls without mashing or mangling the meats or breaking the cell walls, leaving both hulls and meats dry, classifying the resultant particles into several different sizes, and separating the higher density meats of each size from the lower density hulls by density classification.

9. A method of separating hulls from the oil-bearing meat of safflower seeds, comprising the steps of impacting said seeds to instantaneously decelerate them at an apparent particle velocity drop in the range of 50 to 330 feet per second to crack said hulls open while preventing rupture of the oil cells in the meat, leaving both hulls and meats dry; screening the resultant particles into several different sizes, and separating the heavy meats of each size from the light hulls by density classification.

References Cited in the file of this patent

UNITED STATES PATENTS

| | | |
|---|---|---|
| 2,512,523 | Fisher et al. | June 20, 1950 |
| 2,620,841 | Jacobson | Dec. 9, 1952 |

FOREIGN PATENTS

| | | |
|---|---|---|
| 1,106,437 | France | July 20, 1955 |
| 1,158,777 | France | Feb. 3, 1958 |